US011072342B2

(12) United States Patent
Kong et al.

(10) Patent No.: US 11,072,342 B2
(45) Date of Patent: Jul. 27, 2021

(54) ACTIVELY ADAPTING TO DRIVING ENVIRONMENTS BASED ON HUMAN INTERACTIONS

(71) Applicant: TOYOTA RESEARCH INSTITUTE, INC., Los Altos, CA (US)

(72) Inventors: Soonho Kong, Arlington, MA (US); Jonathan DeCastro, Arlington, MA (US); Nikos Arechiga, San Mateo, CA (US); Frank Permenter, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 236 days.

(21) Appl. No.: 16/279,857

(22) Filed: Feb. 19, 2019

(65) Prior Publication Data
US 2020/0262444 A1    Aug. 20, 2020

(51) Int. Cl.
| | | |
|---|---|---|
| *B60W 50/08* | (2020.01) | |
| *G08G 1/16* | (2006.01) | |
| *G05D 1/00* | (2006.01) | |
| *G08G 1/01* | (2006.01) | |
| *G05D 1/02* | (2020.01) | |

(52) U.S. Cl.
CPC ......... *B60W 50/085* (2013.01); *G05D 1/0088* (2013.01); *G08G 1/0133* (2013.01); *G08G 1/166* (2013.01); *G05D 1/0214* (2013.01); *G05D 2201/0213* (2013.01)

(58) Field of Classification Search
CPC ........ B60W 50/08; B60W 50/14; G05D 1/02; G05D 1/00; G06Q 30/02; G01C 21/34; G06K 9/00; G08G 1/16
See application file for complete search history.

(56) References Cited

U.S. PATENT DOCUMENTS

| | | | |
|---|---|---|---|
| 8,996,224 B1 | 3/2015 | Herbach et al. | |
| 9,573,592 B2 | 2/2017 | Prokhorov et al. | |
| 10,513,274 B1* | 12/2019 | Sung | G05D 1/0061 |
| 2015/0134180 A1* | 5/2015 | An | G08G 1/005 |
| | | | 701/23 |
| 2017/0344004 A1* | 11/2017 | Foster | A01B 69/00 |
| 2017/0357859 A1* | 12/2017 | Jain | G06K 9/00791 |

(Continued)

FOREIGN PATENT DOCUMENTS

WO    2018077647 A1    5/2018

OTHER PUBLICATIONS

Walch, Marcel, et al., "Towards Cooperative Driving: Involving the Driver in an Autonomous Vehicle's Decision Making," Automotive'UI 16, Oct. 24-26, 2016, Ann Arbor, Michigan, USA.

(Continued)

*Primary Examiner* — Yuri Kan
(74) *Attorney, Agent, or Firm* — Seyfarth Shaw LLP

(57) ABSTRACT

A method for controlling an autonomous vehicle includes navigating the autonomous vehicle based on a set of rules. The method also includes identifying an abnormality in a current driving situation. The method further includes prompting a passenger of the autonomous vehicle to interact with a driver of a first vehicle in response to identifying the abnormality. The method still further includes controlling the autonomous vehicle to violate one or more rules of the set of rules in response to an indication of a successful interaction with the driver.

20 Claims, 8 Drawing Sheets

(56) References Cited

U.S. PATENT DOCUMENTS

| | | | |
|---|---|---|---|
| 2018/0032086 A1* | 2/2018 | Punithan | G05D 1/0295 |
| 2018/0308363 A1* | 10/2018 | Duncan | G05D 1/0289 |
| 2018/0365740 A1* | 12/2018 | Nix | G07C 5/085 |
| 2019/0086222 A1* | 3/2019 | Arakawa | G05D 1/0297 |
| 2019/0107835 A1* | 4/2019 | Hashimoto | G05D 1/0061 |
| 2019/0220028 A1* | 7/2019 | Anderson | G05D 1/0221 |

OTHER PUBLICATIONS

Walch, Marcel, et al., "Touchscreen Maneuver Approval Mechanisms for Highly Automated Vehicles: A First Evaluation," AutomotiveUI '17, Sep. 24-27, 2017, Oldenburg, Germany.

\* cited by examiner

ACTIVELY ADAPTING TO DRIVING ENVIRONMENTS BASED ON HUMAN INTERACTIONS

BACKGROUND

Field

Certain aspects of the present disclosure generally relate to autonomous vehicles and, more particularly, to a system and method for adjusting an action of an autonomous vehicle in response to human interactions.

Background

In most cases, autonomous vehicles perform actions based on developed rules. For example, a set of rules may be used to safely navigate the autonomous vehicle on a multi-lane road. The set of rules may include a minimum following distance between vehicles in a single lane and also a minimal gap for merging between two vehicles. Actions of the autonomous vehicle are constrained by the set of rules. In theory, if the autonomous vehicle follows each rule, the autonomous vehicle should not be the cause of an accident.

To prevent accidents, the rules may be conservative. Due to the conservative nature of the rules, in some situations, such as heavy traffic situations, the rules may increase driving times. For example, the rules may cause the autonomous vehicle to wait for an ideal situation to merge. It is desirable to improve autonomous vehicles to maintain safety while also mitigating delays and/or other driver inconveniences that may result from following the rules.

SUMMARY

In one aspect of the present disclosure, a method for controlling an autonomous vehicle is disclosed. The method includes navigating the autonomous vehicle based on a set of rules. The method also includes identifying an abnormality in a current driving situation. The method further includes prompting a passenger of the autonomous vehicle to interact with a driver of a first vehicle in response to identifying the abnormality. The method still further includes controlling the autonomous vehicle to violate one or more rules of the set of rules in response to an indication of a successful interaction with the driver.

In another aspect of the present disclosure, a non-transitory computer-readable medium with non-transitory program code recorded thereon is disclosed. The program code is for controlling an autonomous vehicle. The program code is executed by a processor and includes program code to navigate the autonomous vehicle based on a set of rules. The program code also includes program code to identify an abnormality in a current driving situation. The program code further includes program code to prompt a passenger of the autonomous vehicle to interact with a driver of a first vehicle in response to identifying the abnormality. The program code still further includes program code to control the autonomous vehicle to violate one or more rules of the set of rules in response to an indication of a successful interaction with the driver.

Another aspect of the present disclosure is directed to an apparatus for controlling an autonomous vehicle. The apparatus having a memory and one or more processors coupled to the memory. The processor(s) is configured to navigate the autonomous vehicle based on a set of rules. The processor(s) is also configured to identify an abnormality in a current driving situation. The processor(s) is further configured to prompt a passenger of the autonomous vehicle to interact with a driver of a first vehicle in response to identifying the abnormality. The processor(s) still further configured to control the autonomous vehicle to violate one or more rules of the set of rules in response to an indication of a successful interaction with the driver.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As discussed, autonomous vehicles perform actions based on developed rules. For example, the autonomous vehicle may follow a set of rules when driving on a multilane road. In this example, the set of rules may include a rule that establishes a minimum following distance between vehicles in a same lane. The set of rules may include another rule establishing a minimum gap for merging between two vehicles. The aforementioned rules are examples of rules, the rules of the autonomous vehicle are not limited to the rules discussed above. Additionally, for clarity, the autonomous vehicle may be referred to as a vehicle.

Actions of the autonomous vehicle are constrained by the established rules. In theory, if the autonomous vehicle follows each rule, the autonomous vehicle should not be the cause of an accident. To prevent accidents, the rules are set to be conservative. Due to the conservative nature of the rules, in some situations, such as heavy traffic situations, the rules may increase driving times.

As an example, one rule establishes a minimum gap for merging. When the vehicle is in heavy traffic, the minimum gap may not be present. Therefore, the vehicle may wait for a prolonged period of time before merging. The prolonged wait period may be inconvenient to the vehicle's occupant (e.g., passenger). Additionally, failure to merge may cause a traffic backup because vehicles behind the current vehicle cannot merge until the current vehicle merges.

When a vehicle is operated in a manual mode (e.g., operated by a human driver), the human may communicate with other drivers. For example, when a manually operated vehicle is attempting to merge in a heavy traffic situation, the human driver may motion (e.g., wave) to the other drivers to ask them to yield. The yielding vehicle may create a gap that allows the manually operated vehicle to merge.

Aspects of the present disclosure are directed to improving autonomous driving systems by prompting a passenger to interact with other drivers in response to identifying an abnormal driving situation. The interaction is similar to an interaction between human drivers during manual operation. Additionally, the interaction does not compromise safety.

Figure 1:
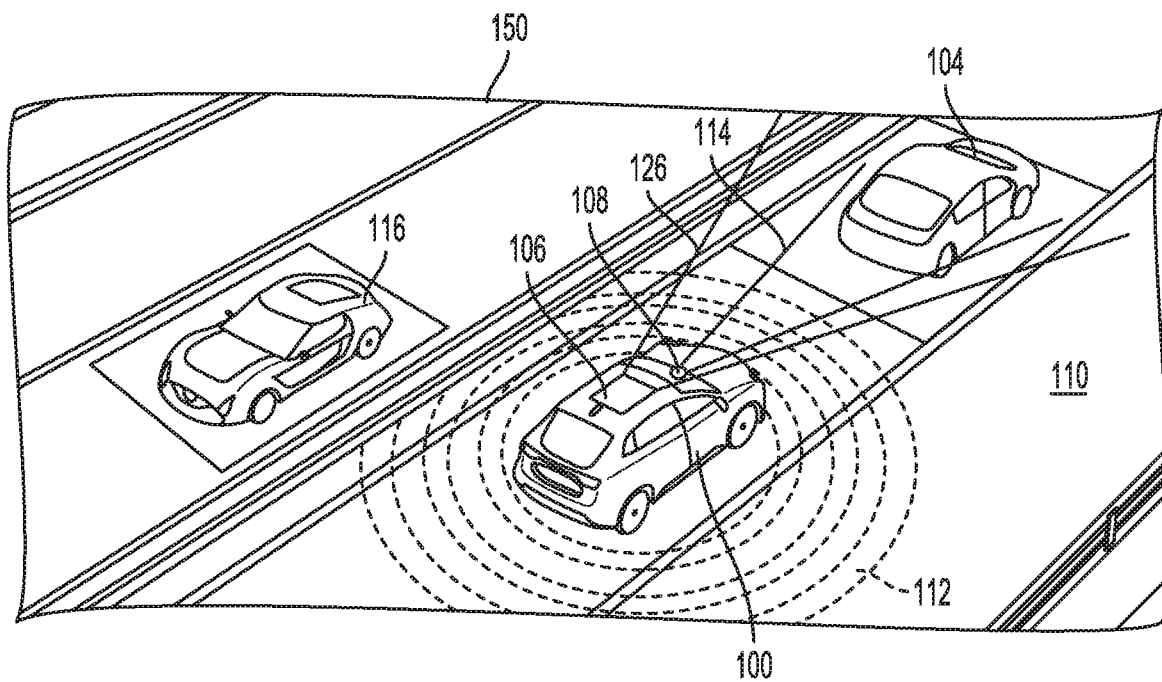
FIG. 1 illustrates an example of a vehicle in an environment according to aspects of the present disclosure.

FIG. 1 illustrates an example of a vehicle 100 (e.g., ego vehicle) in an environment 150 according to aspects of the present disclosure. In the present example, the vehicle 100 is an autonomous vehicle. As shown in FIG. 1, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D RGB camera, and a LIDAR sensor 106. Other sensors, such as RADAR and/or ultrasound, are also contemplated. Additionally, or alternatively, the vehicle 100 may include one or more additional 2D cameras and/or LIDAR sensors. For example, the additional sensors may be side facing and/or rear facing sensors.

In one configuration, the 2D camera 108 captures a 2D image 220 that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. The autonomous driving system of the vehicle 100 may also extract height and/or depth features from the second output stream.

The information obtained from the sensors 106, 108 may be used to evaluate a driving situation (e.g., driving environment). In one configuration, the autonomous driving system determines whether a current driving situation is an abnormal driving situation. Additionally, the autonomous driving system determines if breaking one or more rules will overcome (e.g., mitigate) the abnormal driving situation. Overcoming the abnormal driving situation may reduce an overall drive time, reduce resource use (e.g., fuel or battery use), prevent a collision caused by another vehicle, or generally improve a driving situation. If the passenger in the autonomous vehicle is unable or unwilling to perform the task (e.g., if they are asleep or distracted), the vehicle continues to follow the rules.

As discussed, during vehicle operation, the autonomous driving system monitors the current driving situation to determine if the current driving situation is an abnormal situation. As an example, an abnormal situation may be a deadlock situation where movement of the ego vehicle and one or more vehicles has been less than a distance threshold for pre-determined period of time. The deadlock situation is one example of an abnormal situation, the abnormal situation is not limited to the deadlock situation.

The deadlock situation detection accounts for vehicle movement when a vehicle is waiting. For example, when a vehicle is waiting at a red light or stop sign, the vehicle is not always stationary. As a driver's impatience increases, the vehicle may move up closer and closer. Alternatively, a driver may be tired of pressing the brake, and a slight release of the break may cause the vehicle to move.

As such, the deadlock situation uses a distance threshold when determining if the vehicle is stagnant. That is, if the vehicle's movement over a period of time is less than a distance threshold, the vehicle may be considered stagnant. When the ego vehicle and another vehicle are stagnant, the situation may be considered a deadlock situation. The distance threshold may be different based on the current environment. For example, the distance threshold for a stop sign may be different from a distance threshold for merging.

As discussed, a deadlock situation accounts for a wait time and a distance traveled. For example, an ego vehicle and another vehicle may wait at an intersection for a period of time that satisfies a time threshold (e.g., five seconds). Additionally, the movement (e.g., distance traveled) of the ego vehicle and another vehicle may be less than a threshold (e.g., two feet). In this example, the situation may be a deadlock situation. The deadlock situation may be mitigated by violating one or more rules. Still, to maintain safety, the autonomous driving system does not violate a rule until receiving confirmation that the user has communicated (e.g., negotiated, interacted, etc.) with one or more other drivers.

Figure 2A:
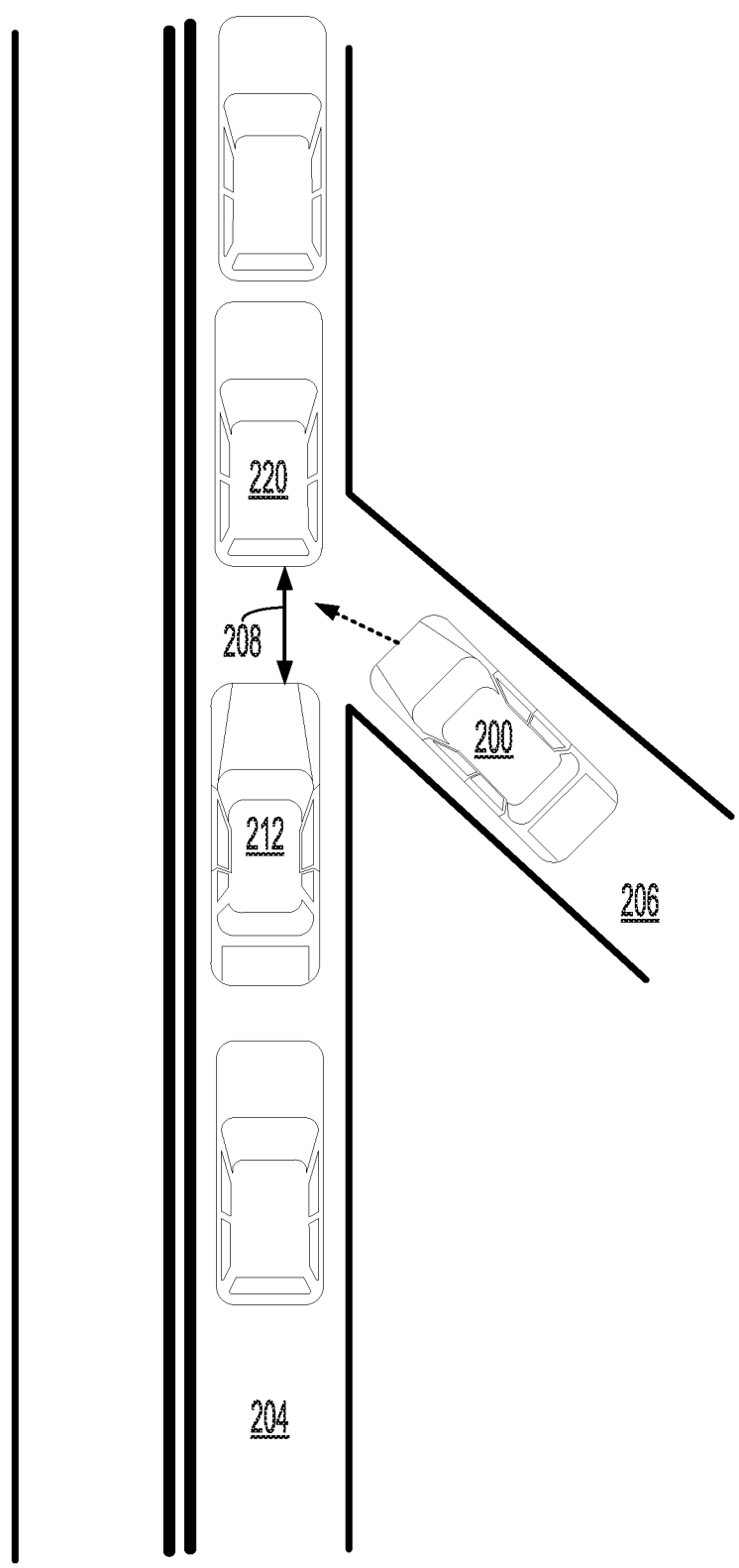
FIG. 2A illustrates an example of an abnormal driving situation according to aspects of the present disclosure.

FIG. 2A illustrates an example of an abnormal driving situation according to aspects of the present disclosure. As shown in FIG. 2A, a vehicle 200 (e.g., merging vehicle 200) is attempting to merge on to a lane 204 from an onramp 206. In the current example, the merging vehicle 200 is operating in an autonomous mode and includes one or more passengers 250 (see FIG. 2C). Additionally, in the example of FIG. 2A, the merging vehicle 200 includes one or more rules for merging. One rule establishes a minimum merging gap for the merging vehicle 200. The minimum merging gap establishes a minimum distance between two vehicles that must be present in order for the merging vehicle 200 to merge between the two vehicles.

For illustrative purposes, in FIG. 2A, the gap 208 between a front vehicle 220 and a rear vehicle 212 is less than the minimum merging gap. The minimum gap may be established based on the length of the merging vehicle 200. For example, the minimum gap may be a sum of a length of the merging vehicle 200, a front buffer, and a rear buffer. As an example, if the length of the merging vehicle 200 is 14', the minimum gap may be 22' (e.g., 14' (length of the vehicle)+4' (front buffer)+4' (rear buffer)).

The merging vehicle 200 may identify the gap 208 based on measurements performed by one or more sensors (not shown in FIG. 2A) of the merging vehicle 200. The sensors may include LIDAR, RADAR, camera, or other types of sensors. After measuring the gap 208, the merging vehicle 200 (e.g., the autonomous system of the merging vehicle 200) determines if the gap 208 satisfies the minimum merging gap.

In the present example, the gap 208 is less than the minimum merging gap. Therefore, the autonomous system will not allow the merging vehicle 200 to merge between the front vehicle 220 and the rear vehicle 212. In conventional systems, the merging vehicle 200 waits until a subsequent gap is equal to or greater than the minimum merging gap. Still, waiting for a satisfactory gap may delay drive time.

In one configuration, after determining that the gap 208 does not satisfy the minimum merging gap, the merging vehicle 200 determines if the current situation is an abnormal situation. For example, the merging vehicle 200 may scan the lane 204 to measure traffic. Traffic information may also be obtained via wireless communications (e.g., cellular, WiFi, etc.), such as communications with an Internet traffic site or a traffic data center.

Based on the scanning and/or traffic information, the merging vehicle 200 may determine that the traffic is greater than a threshold. If the traffic is greater than a threshold, the merging vehicle 200 determines that the current driving situation is abnormal. That is, due to the increased traffic, a satisfactory gap may not be present. As such, based on training, the merging vehicle determines that the abnormal driving situation may be mitigated if the rear vehicle 212 yields to expand the gap 208. The expanded gap (not shown) may satisfy the minimum merging gap. Alternatively, the expanded gap may be less than the minimum merging gap and greater than the gap 208 that was present before the rear vehicle 212 yielded, thereby improving safety.

As another example, the merging vehicle 200 may determine that a distance traveled for a period of time is less than a distance threshold. Furthermore, the merging vehicle 200 may also determine that the rear vehicle's 112 distance traveled for a period of time is less than a distance threshold. Therefore, the current driving situation may be a deadlock situation between the merging vehicle 200 and the rear vehicle 112. As discussed, the deadlock situation is one type of abnormal driving situation. The travel distance may be determined from one or more sensors, such as a positioning sensor, LIDAR, RADAR, and/or other sensors.

After determining that the abnormal driving situation may be mitigated by expanding the gap 208, the merging vehicle 200 determines if the rear vehicle 212 is operated by a human driver (e.g., manual mode). The merging vehicle may also determine if the rear vehicle is operated by the human driver prior to determining that the abnormal driving situation may be mitigated. In one configuration, the merging vehicle uses the gap 208 (e.g., length of the gap 208) to determine if the rear vehicle 212 is operated by a human.

As discussed, autonomous vehicles operate based on rules. Some rules may be standardized by the industry and/or set by a government entity. One of the rules establishes a minimum following distance, such that an autonomous vehicle should be at least the minimum following distance behind a preceding vehicle. In one configuration, if the gap 208 is less than the minimum following distance, the merging vehicle 200 determines that the rear vehicle 212 is operating in a manual mode.

That is, the rear vehicle 212 would not break the minimum following distance if the rear vehicle 212 was operating in an autonomous mode. Aspects of the present disclosure are not limited to using the minimum distance rule for determining whether the rear vehicle 212 is operating in the manual mode. The autonomous system may use other types of rule violations to determine whether the rear vehicle 212 is operating in the manual mode. Other rule violations may include, for example, a vehicle's speed being greater than a threshold, a vehicle using high beam lights on a busy road, or another type of rule violation.

Because the minimum merging gap is dynamic (e.g., based on a length of the merging vehicle 200), the minimum following distance may be different from the minimum merging gap. Therefore, the gap 208 may be greater than the minimum following distance and less than the minimum merging distance. For example, the minimum merging distance for a truck is greater than the minimum merging distance of a two-seat roadster. Thus, for the truck, the gap 208 may not satisfy the truck's minimum merging distance even if the gap 208 is greater than the minimum following distance.

In addition to, or alternate from using a rule violation to determine if the rear vehicle 212 is being operated in the manual mode, the merging vehicle 200 may use information obtained from one or more sensors to determine if the rear vehicle 212 is operating in the manual mode. For example, the image capturing device may capture a series of images of a cockpit of the rear vehicle 212. The series of images may capture a human actively operating the rear vehicle 212 (e.g., sitting behind the steering wheel, moving the steering wheel, etc.). Based on the series of images, the autonomous system of the merging vehicle 200 may determine that the rear vehicle 212 is operating in the manual mode by a human driver.

In one configuration, the merging vehicle 200 communicates with the rear vehicle 212, via a communication channel (e.g., cellular, satellite, WiFi, etc.), to determine if the rear vehicle 212 is operating in the manual mode. For example, the merging vehicle 200 may ping the rear vehicle 212 to request information regarding the rear vehicle's 212 operating mode. As another example, the rear vehicle 212 may broadcast its operating mode. Determining a vehicle's operating mode via a communication channel may be performed in addition to, or alternate from, one or more of the other methods for determining the operating mode.

In another configuration, the merging vehicle 200 assumes that all other vehicles 212, 220 are manually operated. In this configuration, the merging vehicle 200 does not perform a function for determining whether the rear vehicle 212 is manually operated. Rather, upon detecting the abnormal driving situation, the merging vehicle 200 prompts the passenger to interact with the driver of the rear vehicle 212. If the rear vehicle 212 is not operated by a human, the passenger may inform the autonomous driving system that the rear vehicle 212 is autonomously operated.

According to aspects of the present disclosure, after determining that the rear vehicle 212 is not operated by a human, the merging vehicle 200 may continue one or more of the processes discussed above until a manually operated vehicle or a satisfactory gap is identified. Upon identifying the manually operated vehicle (e.g., human operated vehicle), the merging vehicle 200 prompts a passenger to negotiate with the driver of the manually operated vehicle. For simplicity, it will be assumed that the rear vehicle 212 is manually operated.

The prompt may be provided via one or more displays of the merging vehicle, such as a dashboard display, a radio interface, a heads-up-display (HUD), etc. The prompt instructs the passenger to communicate with the driver of the rear vehicle 212. The instruction may be a specific instruction, such as "REQUEST A YIELD," based on the current environment and/or abnormal situation. The instruction may also indicate a specific vehicle (e.g., rear vehicle 212) that is a target for negotiation. Alternatively, the instruction may be a general instruction, such as "NEGOTIATE WITH OTHER DRIVERS."

Figure 2B:
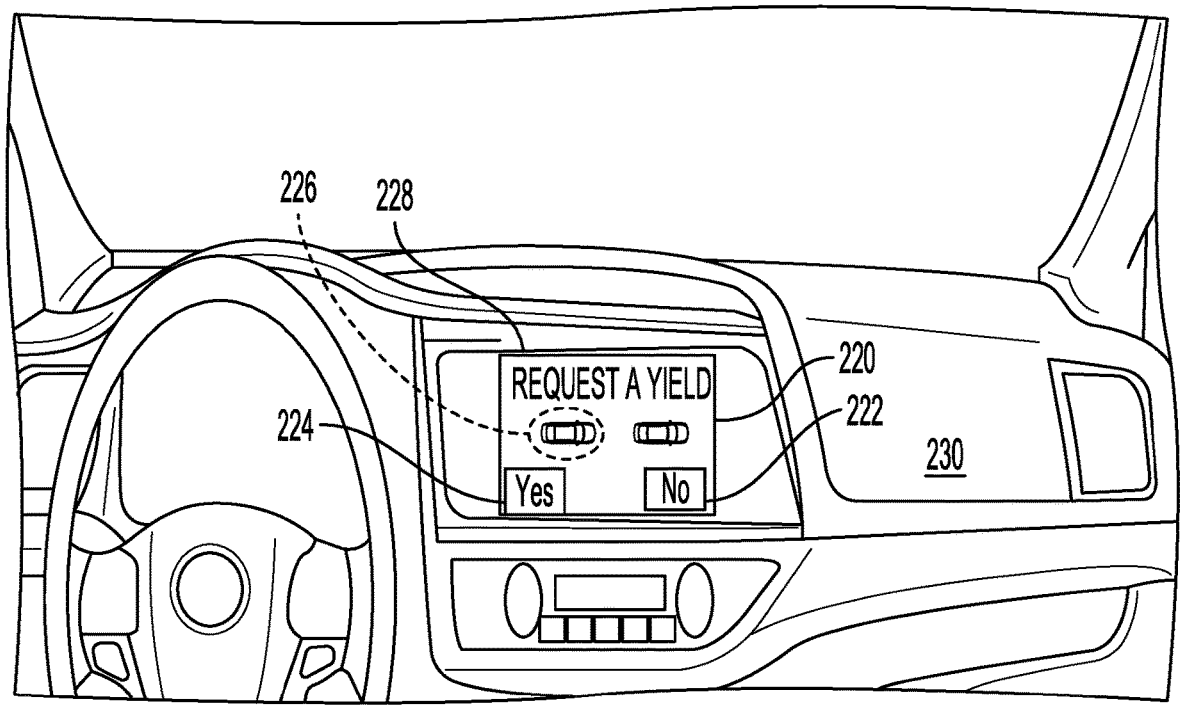
FIG. 2B illustrates an example of an interactive interface according to aspects of the present disclosure.

FIG. 2B illustrates an example of a prompt 228 provided to a passenger via a display unit 220 defined in a center console 230 of a vehicle (e.g., the merging vehicle 200). As discussed, the display unit 220 may be a dashboard display, a radio interface, a HUD, or another type of display. In the current example, the display unit 220 is a touchscreen integrated with the merging vehicle 200. The display unit 220 provides a prompt 228, such as "REQUEST A YIELD," in response to the abnormal driving situation.

The display unit 220 may also identify a target vehicle 226 that is a target for negotiation (e.g., driver interaction). The target vehicle 226 may correspond to another vehicle in the deadlock situation with the merging vehicle 200 (e.g., ego vehicle). In this example, the target vehicle 226 corresponds to the rear vehicle 212.

The passenger may provide feedback to the merging vehicle 200 via the display unit 220, or another interface, if the passenger successfully negotiated with the driver of the rear vehicle 212. For example, the passenger may provide an input via a first input interface 224 (e.g., button) to indicate the negotiation was successful. As another example, the passenger may provide an input via a second input interface 224 (e.g., button) to indicate the negotiation was unsuccessful.

Figure 2C:
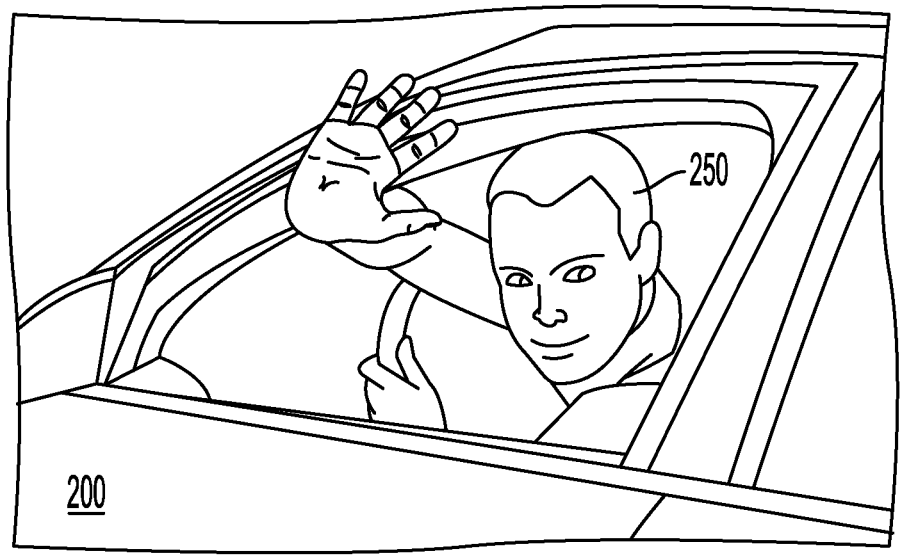
FIG. 2C illustrate an example of passenger and driver interaction according to aspects of the present disclosure.
Figure 2C:
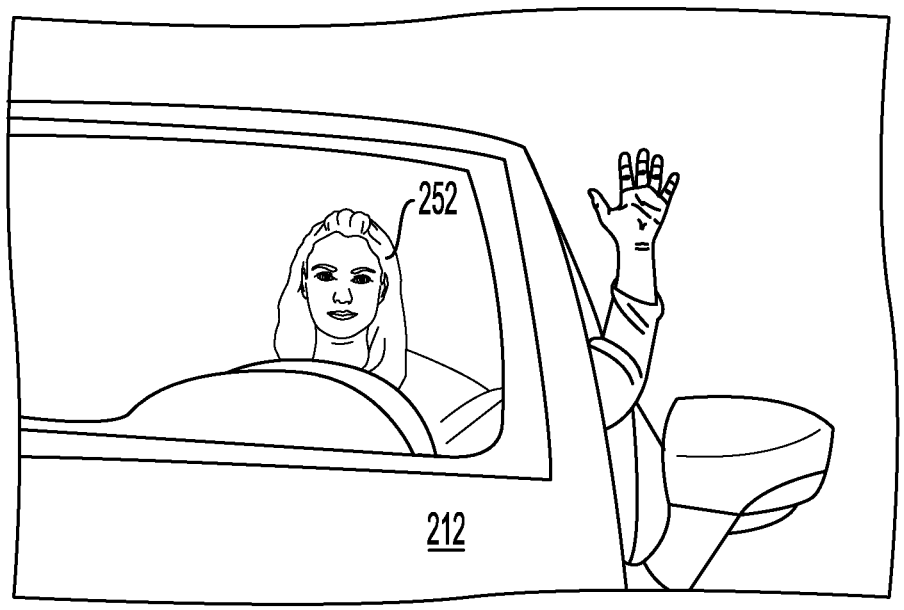

FIG. 2C illustrates an example of a passenger interaction according to aspects of the present disclosure. As shown in FIG. 2C, in response to the prompt 228, the passenger 250 of the merging vehicle 200 attempts an interaction with a driver 252 of the rear vehicle 212. As an example, the interaction may be a waving motion, or another type of interaction to request a yield.

In response to the passenger's 250 interaction, the driver 252 may acknowledge the passenger's 250 interaction. For example, the driver 252 may provide a hand wave to acknowledge the passenger's 250 interaction. The hand wave may be an indication of a successful negotiation.

As another example, (not shown in FIG. 2C), the driver 252 may not respond to the passenger's 250 interaction. In yet another example, (not shown in FIG. 2C), the driver 252 may refuse the passenger's 250 request for a yield. For example, the driver 252 may shake her head, indicating a refusal. The driver's 252 failure to response or a refusal may be an indication of an unsuccessful negotiation.

If the passenger indicates the negotiation was successful, the merging vehicle 200 will begin to merge into the gap 208. During the merge, one or more sensors of the merging vehicle 200 will continue to monitor the gap 208 for safety. If the passenger indicates the negotiation was unsuccessful or if the passenger does not respond, the merging vehicle 200 will continue to follow the rules. That is, the merging vehicle 200 will not merge into the gap 208 and waits for a satisfactory gap or a successful negotiation with another driver.

Figure 3:
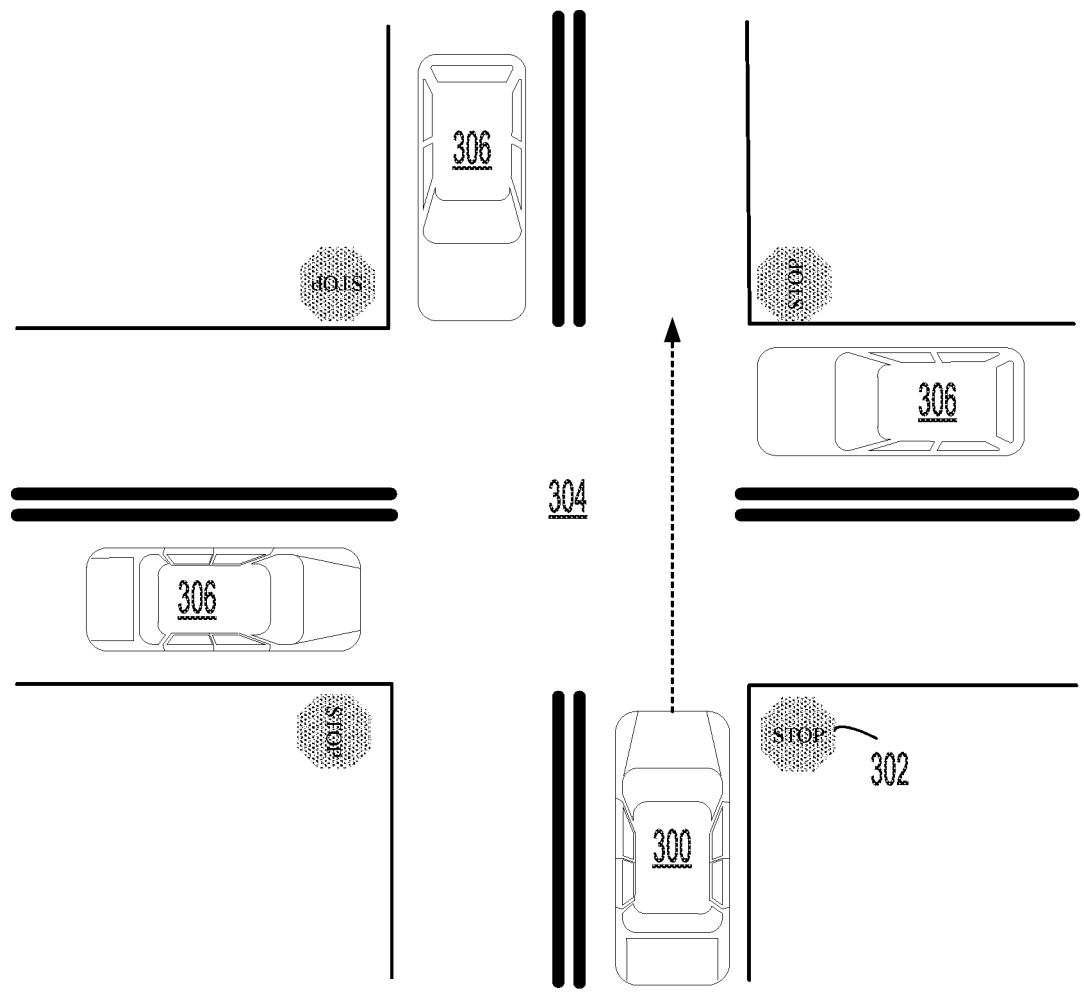
FIGS. 3 and 4 illustrate examples of abnormal driving situations according to aspects of the present disclosure.

FIG. 3 illustrates an example of a driving situation that may be improved by breaking a rule according to aspects of the present disclosure. As shown in FIG. 3, a vehicle 300 (e.g., autonomous vehicle 300) is stopped at an intersection 304 due to the presence of a stop sign 302. The vehicle 300 would like to continue moving through the intersection 304. Due to one or more rules, the vehicle 300 may be cautious when crossing the intersection 304. A set of vehicles 306 may misinterpret the cautiousness as hesitance and may also wait at the intersection.

If a wait time at the stop sign 302 exceeds a time threshold and a travel distance of the vehicle 300 and one or more vehicles of the set of vehicles 306 is less than a distance threshold, the vehicle 300 may determine that the current driving situation is a deadlock situation (e.g., abnormal driving situation). The time threshold may be a predetermined acceptable time for waiting at a stop sign 302. The vehicle 300 may assume that one or more vehicles of the set of vehicles 306 are manually operated. The vehicle 300 may then prompt the passenger to negotiate with drivers of the set of vehicles 306. The prompt may request the passenger to ask the drivers of the set of vehicles 306 to yield, such that the vehicle 300 may proceed through the intersection 304.

If the passenger indicates the negotiations (e.g., interactions) were successful, the vehicle 300 will proceed through the intersection 304. If the passenger indicates the negotiations were unsuccessful or if the passenger does not respond, the vehicle 300 will continue to follow the rules and wait at the stop sign 302. That is, the vehicle 300 will not proceed through the intersection 304. The vehicle 300 may wait for the passenger to successfully negotiate with another set of vehicles or for a break in traffic at the intersection 304.

Figure 4:
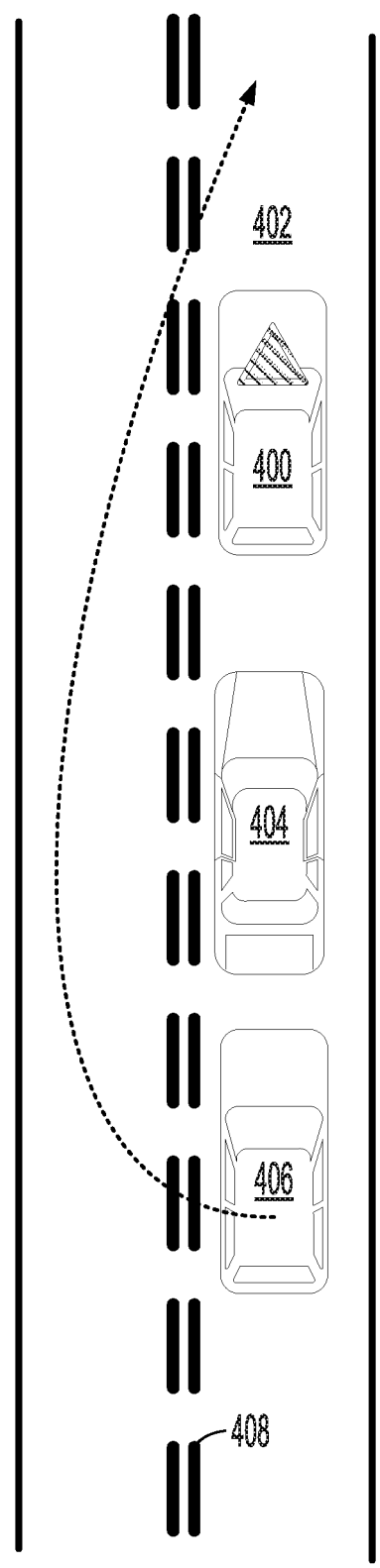

FIG. 4 illustrates an example of a deadlock driving situation according to aspects of the present disclosure. As shown in FIG. 4, a preceding vehicle 400 has stopped in a lane 402. The preceding vehicle 400 (e.g., stopped vehicle 400) may have stopped due to a mechanical failure or for another reason. In this example, an autonomous vehicle 404 (e.g., vehicle 404) is stuck behind the stopped vehicle 400 because the vehicle's 404 rules do not allow the vehicle 404 to cross the dividing line 408 to drive around the stopped vehicle 400. Other cars 406 behind the vehicle 404 are crossing a dividing line 408 to drive around the stopped vehicle 400. For simplicity, only one other car 406 is shown behind the vehicle 404.

If a wait time behind the stopped vehicle 400 exceeds a time threshold and movement from the vehicle 404 and the stopped vehicle 400 is less than a distance threshold, the vehicle 404 may determine that the current driving situation is a deadlock situation (e.g., abnormal driving situation). Additionally, or alternatively, the vehicle 404 may notice, via one or more sensors, the other cars 406 driving around the stopped vehicle 400. In response, the vehicle 404 may determine that the current situation is an abnormal driving situation. The vehicle 404 may also determine that the current driving situation may be improved by driving around the stopped vehicle 400.

As discussed, one or more rules may prevent the vehicle 404 from crossing the dividing line 408 to drive around the stopped vehicle 400. Therefore, after identifying the abnormal driving situation, the vehicle 404 prompts the passenger for permission to cross the dividing line 408 to drive around the stopped vehicle 400. If the passenger provides permission, the vehicle 404 will proceed to cross the dividing line 408 to drive around the stopped vehicle 400. If the passenger denies permission or if the passenger does not respond, the vehicle 404 will continue to wait behind the stopped vehicle 400.

If the passenger did not provide a response, the vehicle 404 may intermittently request permission. For example, the passenger may be sleeping and unaware of the abnormal situation. Therefore, the vehicle 404 may continue to ask until permission is received, or the abnormal situation is resolved (e.g., the stopped car 400 moves).

Figure 5:
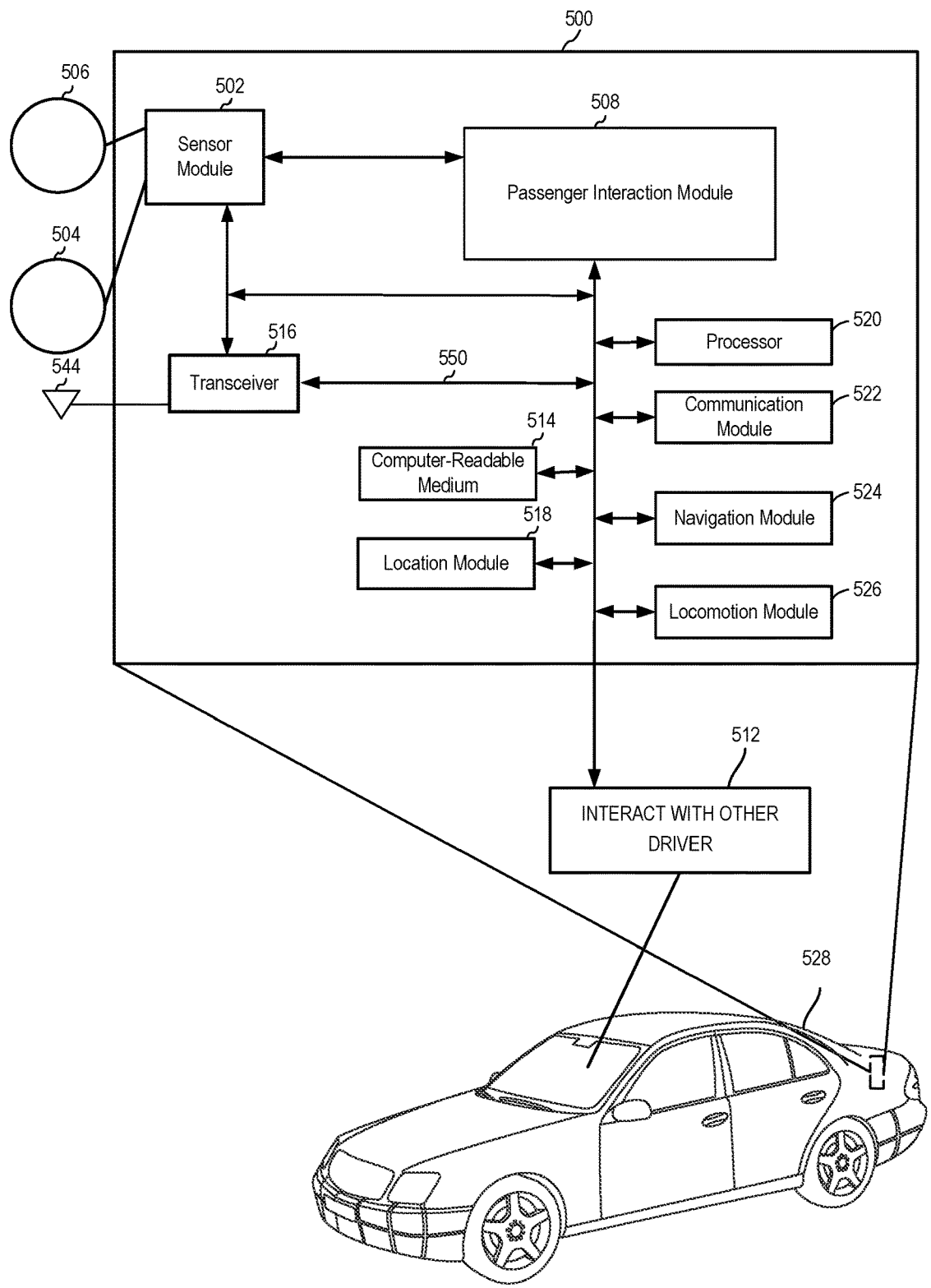
FIG. 5 is a diagram illustrating an example of a hardware implementation for passenger interaction system for an autonomous vehicle according to aspects of the present disclosure.

FIG. 5 is a diagram illustrating an example of a hardware implementation for a passenger interaction system 500, according to aspects of the present disclosure. The passenger interaction system 500 may be a component of a vehicle, a robotic device, or another device. For example, as shown in FIG. 5, the passenger interaction system 500 is a component of an autonomous vehicle 528. Aspects of the present disclosure are not limited to the autonomous vehicle 528, as other devices, such as a bus, boat, drone, or robot, are also contemplated for using the passenger interaction system 500. The autonomous vehicle 528 may be autonomous or semi-autonomous.

The passenger interaction system 500 may be implemented with a bus architecture, represented generally by a bus 550. The bus 550 may include any number of interconnecting buses and bridges depending on the specific application of the passenger interaction system 500 and the overall design constraints. The bus 550 links together various circuits including one or more processors and/or hardware modules, represented by a processor 520, a communication module 522, a location module 518, a sensor module 502, a locomotion module 526, a navigation module 524, a computer-readable medium 514, a passenger interaction module 508, and a passenger interface 512. The bus 550 may also link various other circuits such as timing sources, peripherals, voltage regulators, and power management circuits, which are well known in the art, and therefore, will not be described any further.

The passenger interaction system 500 includes a transceiver 516 coupled to the processor 520, the sensor module 502, the passenger interaction module 508, the passenger interface 512, the communication module 522, the location module 518, the locomotion module 526, the navigation module 524, and the computer-readable medium 514. The transceiver 516 is coupled to an antenna 544. The transceiver 516 communicates with various other devices over a transmission medium. For example, the transceiver 516 may receive commands via transmissions from a user or a remote device. As another example, the transceiver 516 may transmit driving statistics and information from the passenger interaction module 508 to a server (not shown).

The passenger interaction system 500 includes the processor 520 coupled to the computer-readable medium 514. The processor 520 performs processing, including the execution of software stored on the computer-readable medium 514 providing functionality according to the disclosure. The software, when executed by the processor 520, causes the passenger interaction system 500 to perform the various functions described for a particular device, such as the autonomous vehicle 528, or any of the modules 502, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or a red-green-blue (RGB) camera, for capturing 2D images. The second sensor 504 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 504, 506. The measurements of the first sensor 506 and the second sensor 504 may be processed by one or more of the processor 520, the sensor module 502, the communication module 522, the location module 518, the passenger interaction module 508, the locomotion module 526, and the navigation module 524, in conjunction with the computer-readable medium 514, to implement the functionality described herein. In one configuration, the data captured by the first sensor 506 and the second sensor 504 may be transmitted to an external device via the transceiver 516. The first sensor 506 and the second sensor 504 may be coupled to the autonomous vehicle 528 or may be in communication with the autonomous vehicle 528.

The location module 518 may be used to determine a location of the autonomous vehicle 528. For example, the location module 518 may use a global positioning system (GPS) to determine the location of the autonomous vehicle 528. The communication module 522 may be used to facilitate communications via the transceiver 516. For example, the communication module 522 may be configured to provide communication capabilities via different wireless protocols, such as WiFi, long term evolution (LTE), 4G, etc. The communication module 522 may also be used to communicate with other components of the autonomous vehicle 528 that are not modules of the passenger interaction system 500.

The locomotion module 526 may be used to facilitate locomotion of the autonomous vehicle 528. As an example, the locomotion module 526 may control the movement of the wheels. As another example, the locomotion module 526 may be in communication with a power source of the autonomous vehicle 528, such as an engine or batteries. Of course, aspects of the present disclosure are not limited to providing locomotion via wheels and are contemplated for other types of components for providing locomotion, such as propellers, treads, fins, and/or jet engines.

The passenger interaction system 500 also includes the navigation module 524 for planning a route or controlling the locomotion of the autonomous vehicle 528, via the locomotion module 526. The navigation module 524 may be in communication with the passenger interaction module 508, the sensor module 502, the transceiver 516, the processor 520, the communication module 522, the location module 518, the locomotion module 526, the navigation module 524, and the computer-readable medium 514. In one configuration, the navigation module 524 overrides the user input. The modules may be software modules running in the processor 520, resident/stored in the computer-readable medium 514, one or more hardware modules coupled to the processor 520, or some combination thereof.

According to aspects of the present disclosure, the passenger interaction system 500 includes a passenger interaction module 508 in communication with the navigation module 524, passenger interface 512, the sensor module 502, the transceiver 516, the processor 520, the communication module 522, the location module 518, the locomotion module 526, and the computer-readable medium 514.

In one configuration, the passenger interaction module 508 controls the passenger interface 512 to prompt the passenger to perform an action and/or to provide input. For example, as shown in FIG. 5, the passenger interface 512 displays a message "INTERACT WITH OTHER DRIVER." Based on information provided by the navigation module 524, the sensor module 502, the transceiver 516, the processor 520, the communication module 522, the location module 518, the locomotion module 526, and the computer-readable medium 514, the passenger interaction module 508 may determine that the current driving situation is an abnormal situation (e.g., a situation that may be improved by breaking one or more rules). The passenger interaction module 508 may also identify the specific rule(s) that may be broken to improve the current driving situation.

The passenger interface 512 may be an interactive interface for displaying information and receiving an input. For example, the passenger interface 512 may generate an output to request the passenger to interact with one or more human drivers. The human drivers may be identified by the passenger interaction module 508 based on information provided by the sensor module 502, the processor 520, and/or the communication module 522. The passenger interface 512 may also provide an option for the passenger to indicate whether the interaction was successful or unsuccessful. Additionally, or alternatively, the passenger interaction module may provide an input requesting permission to break one or more rules.

In response to an indication that the interaction was successful or one or more rules may be broken, the passenger interaction module 508 instructs the navigation module 524 to control the locomotion module 526 to autonomously navigate the autonomous vehicle 528 to break one or more of the rules to improve the current driving situation. A notification system, such as a display screen on a dashboard, of the autonomous vehicle 528 may provide the instructions to the driver.

Figure 6:
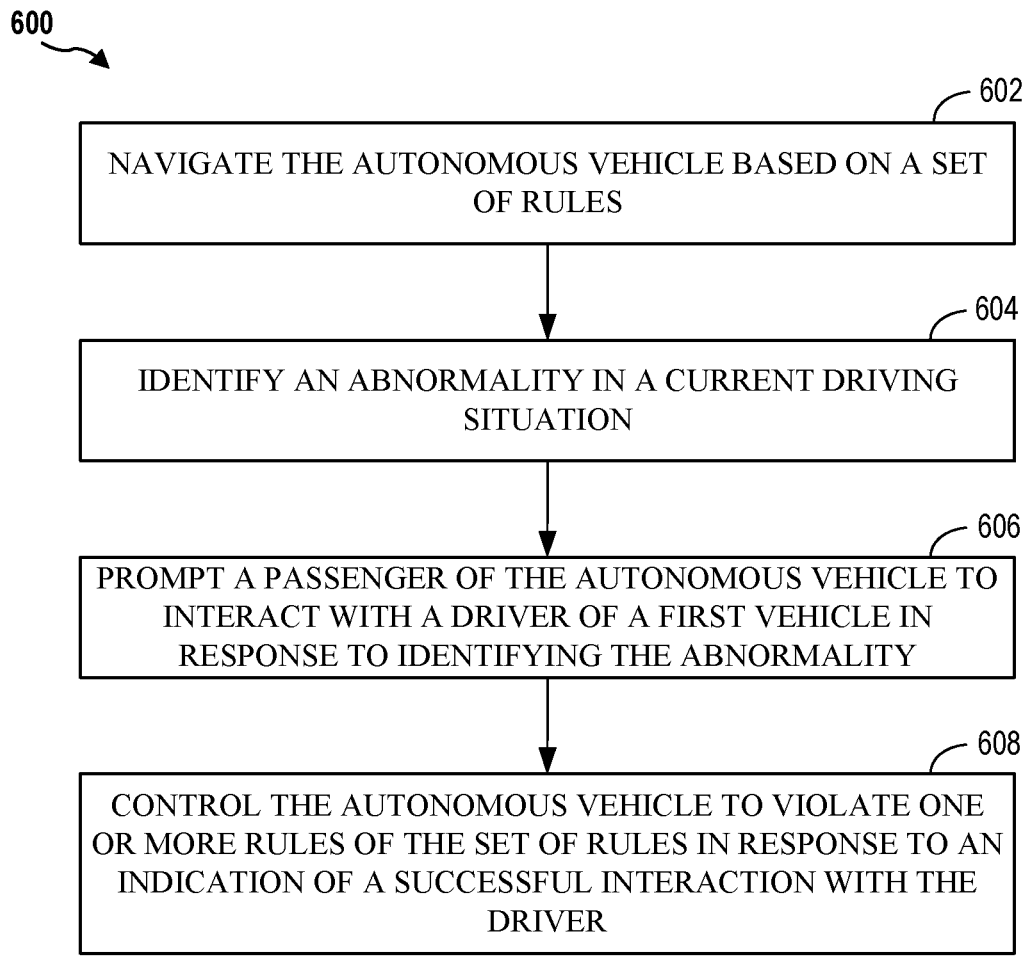
FIG. 6 illustrates a flow diagram for controlling an autonomous vehicle according to aspects of the present disclosure.

FIG. 6 illustrates a method 600 for controlling an autonomous vehicle according to an aspect of the present disclosure. At block 602, an autonomous vehicle system navigates the autonomous vehicle based on a set of rules. The set of rules include rules to prevent a collision with another object. For example, the set of rules may include a minimum velocity, maximum velocity, minimum merging distance, minimum following distance, and other rules.

At block 604, the autonomous vehicle system identifies an abnormality in a current driving situation. As an example, a deadlock situation may be an abnormality. The deadlock situation occurs when a velocity of the autonomous vehicle and another vehicle is less than a threshold for a period of time. That is, a deadlock situation may be detected when a speed of the autonomous vehicle and another vehicle is less than a threshold, for a period of time. As another example, the deadlock situation may be detected when a distance traveled by the autonomous vehicle and another vehicle is less than a threshold, for a period of time.

In another example, excess traffic may be an abnormality. That is, the abnormality is detected when an amount of traffic exceeds a traffic threshold. The amount of traffic may be determined via one or more vehicle sensors and/or via information provided from a traffic control center.

At block 606, the autonomous vehicle system (e.g., passenger interaction system) prompts a passenger of the autonomous vehicle to interact with a driver of a first vehicle in response to identifying the abnormality. The passenger may be prompted via an interactive display of the autonomous vehicle (see FIG. 2B). For example, the interactive display may be a touchscreen integrated with a center console or dashboard of the autonomous vehicle.

In one configuration, the autonomous vehicle assumes all other vehicles are manually operated (e.g., operated by a human driver). In another configuration, the autonomous vehicle system may determine that another vehicle is operating in a manual mode based on the other vehicle violating one or more rules of the set of rules. Additionally, or alternatively, the autonomous vehicle system may determine that another vehicle is operating in a manual mode based on an input from one or more sensors of the autonomous vehicle.

At block 608, the autonomous vehicle system controls the autonomous vehicle to violate one or more rules of the set of rules in response to an indication of a successful interaction with the driver. The indication of the successful interaction may be received via an input received at the interactive display. In one configuration, the autonomous vehicle continues to follow the set of rules in response to an indication of an unsuccessful interaction with the driver or when an input is not received after prompting the passenger. Additionally, the autonomous vehicle system controls the autonomous vehicle to follow the set of rules after violating one or more rules to overcome the abnormal situation.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method performed by an autonomous vehicle, comprising:
navigating the autonomous vehicle based on a set of rules;
identifying an abnormality in a current driving situation;
prompting a passenger of the autonomous vehicle to interact with a driver of a first vehicle in response to identifying the abnormality;
receiving, from the passenger, an input at an interference of the autonomous vehicle indicating a successful interaction or an unsuccessful interaction with the driver; and
controlling the autonomous vehicle to violate at least one rule of the set of rules based on the input indicating the successful interaction with the driver.

2. The method of claim 1, in which identifying the abnormality comprises:
determining both a velocity of the autonomous vehicle and a velocity of the first vehicle are less than a threshold for a period of time, or
determining an amount of traffic exceeds a traffic threshold.

3. The method of claim 1, further comprising determining that the first vehicle is operating in a manual mode based on the first vehicle violating at least one rule of the set of rules or input from a sensor of the autonomous vehicle.

4. The method of claim 1, further comprising controlling the autonomous vehicle to continue to follow the set of rules based on the input indicating the unsuccessful interaction with the driver or when an input is not received after prompting the passenger.

5. The method of claim 1, in which the set of rules comprise rules to prevent a collision with another object.

6. The method of claim 1, further comprising controlling the autonomous vehicle to follow the set of rules after violating the at least one rule.

7. The method of claim 1, further comprising prompting the passenger via an interactive display of the autonomous vehicle.

8. An apparatus for controlling an autonomous vehicle, the apparatus comprising:
a memory; and
at least one processor coupled to the memory, the at least one processor configured:
to navigate the autonomous vehicle based on a set of rules;
to identify an abnormality in a current driving situation;
to prompt a passenger of the autonomous vehicle to interact with a driver of a first vehicle in response to identifying the abnormality;
to receive, from the passenger, an input at an interference of the autonomous vehicle indicating a successful interaction or an unsuccessful interaction with the driver; and
to control the autonomous vehicle to violate at least one rule of the set of rules based on the input indicating the successful interaction with the driver.

9. The apparatus of claim 8, in which the at least one processor is further configured to identify the abnormality by:
determining both a velocity of the autonomous vehicle and a velocity of the first vehicle are less than a threshold for a period of time, or
determining an amount of traffic exceeds a traffic threshold.

10. The apparatus of claim 8, in which the at least one processor is further configured to determine that the first vehicle is operating in a manual mode based on the first vehicle violating at least one rule of the set of rules or input from a sensor of the autonomous vehicle.

11. The apparatus of claim 8, in which the at least one processor is further configured to control the autonomous vehicle to continue to follow the set of rules based on the input indicating the unsuccessful interaction with the driver or when an input is not received after prompting the passenger.

12. The apparatus of claim 8, in which the set of rules comprise rules to prevent a collision with another object.

13. The apparatus of claim 8, in which the at least one processor is further configured to control the autonomous vehicle to follow the set of rules after violating the at least one rule.

14. The apparatus of claim 8, in which the at least one processor is further configured to prompt the passenger via an interactive display of the autonomous vehicle.

15. A non-transitory computer-readable medium having program code recorded thereon for controlling an autonomous vehicle, the program code executed by a processor and comprising:
  program code to navigate the autonomous vehicle based on a set of rules;
  program code to identify an abnormality in a current driving situation;
  program code to prompt a passenger of the autonomous vehicle to interact with a driver of a first vehicle in response to identifying the abnormality;
  program code to receive, from the passenger, an input at an interference of the autonomous vehicle indicating a successful interaction or an unsuccessful interaction with the driver; and
  program code to control the autonomous vehicle to violate at least one rule of the set of rules based on the input indicating the successful interaction with the driver.

16. The non-transitory computer-readable medium of claim 15, in which the program code to identify the abnormality comprises:
  program code to determine both a velocity of the autonomous vehicle and a velocity of the first vehicle are less than a threshold for a period of time, or
  program code to determine an amount of traffic exceeds a traffic threshold.

17. The non-transitory computer-readable medium of claim 15, further comprising program code to determine that the first vehicle is operating in a manual mode based on the first vehicle violating at least one rule of the set of rules or input from a sensor of the autonomous vehicle.

18. The non-transitory computer-readable medium of claim 15, further comprising program code to control the autonomous vehicle to continue to follow the set of rules based on the input indicating the unsuccessful interaction with the driver or when an input is not received after prompting the passenger.

19. The non-transitory computer-readable medium of claim 15, in which the set of rules comprise rules to prevent a collision with another object.

20. The non-transitory computer-readable medium of claim 15, further comprising program code to control the autonomous vehicle to follow the set of rules after violating the at least one rule.

* * * * *